Patented Jan. 13, 1948

2,434,429

UNITED STATES PATENT OFFICE 2,434,429

MANUFACTURE OF OLEOMARGARINE

Clarence E. Nelson, Chicago, Ill., assignor to Kraft Foods Company, a corporation of Delaware No Drawing. Application August 8, 1942, Serial No. 454,148

2 Claims. (Cl. 99—122)

The invention relates to the manufacture of oleomargarine and has particular reference to improvements in the later stages of the process which follow the preparation of the blend or mix of the various ingredients which go to make up a batch of oleomargarine according to known methods of manufacture.

According to the usual methods of oleomargarine manufacture, a blend is made by mixing together the various ingredients such as a vegetable oil or oils, a certain percentage of skim milk to which a culture has been added, in addition to which various other ingredients such as common salt, sometimes a small percentage of benzoate of soda, stabilizing agents, flavoring and vitamins, if desired, are incorporated in the batch.

In view of the fact that oleomargarine should preferably have a melting point and a consistency as close as possible to those possessed by cow's butter, the melting point, or rather the temperature, at which the material possesses a somewhat liquid consistency should approximate that of butter, while at normal room temperatures such as 70° or 75° F. the material should have a relatively solid consistency. The required consistency at such temperatures is obtained by selecting an oil or fat, or a blend of oils or fats, which will be relatively solid at a temperature of 100°, so that, when the other ingredients are added, the melting point of the mix will be reduced to about 95° to 100° F. According to the official definition published in the Federal Register of June 7, 1941, pages 2761, 2762 and 2763, oleomargarine contains at least 80% of fat or oil.

According to the old process, a blend or mix containing all of the ingredients, and being in a more or less liquid condition at about 95° F., is then cooled sufficiently, in a single stage either as part of a continuous operation, or in a batch operation, until the temperature has been reduced to about 40° to 50° F. by which time the material has assumed the consistency of butter. The material is then mechanically worked and formed into prints or masses of standard weight which are packaged in the same manner as butter is wrapped and packaged for shipment.

Various methods of cooling the mix from its original temperature of say 95° F. to the packaging temperature of about 50° F. have been employed. However, so far as I am aware, such cooling has always been effected in a single stage as a more or less continuous operation to the end that such cooling should be effected as rapidly as possible consistent with available cooling methods and equipment.

I have discovered that a marked improvement in cost of manufacture, in the quality and characteristics of the final product, and in the facility and economy with which the same may be packaged, can be effected by subjecting the hot mix or blend to a special treatment differing from the ordinary one-stage cooling in that I cool the mix to a very slight extent, or to an extent sufficient only to bring the blend into a condition which fits it for final conversion into a material suitable for packaging. Said special treatment step consists in subjecting the slightly cooled "conditioned" blend to a viscolizing treatment which can be effected in a viscolizer, homogenizer, colloid mill, or the equivalent. After the viscolizing step, no further cooling or other treatment is required prior to packaging.

The material, after the conditioning and viscolizing steps, usually at a temperature of about 75° to 85° F. is in a semi-liquid condition and is ready to be introduced directly into the final shipping packages without further cooling. Such packaging can be effected by the use of machines such as are employed in the filling of processed cheese packages or mayonnaise jars, and it is not necessary to employ any complicated or expensive machinery for forming the material into prints, as is the practice in the case of oleomargarine manufactured according to prior known processes.

I will now describe a specific application of the invention as applied to the manufacture of oleomargarine of more or less standard composition.

First describing the selection and percentages of the various ingredients, it will be understood that, according to well-known practices, I take a hydrogenated vegetable oil such as cottonseed oil or a blend of similar oils, which has a melting point of about 100° F. The temperature of the oil is raised to approximately 100° F., at which temperature the oil is, of course, in liquid form. To the oil is then added an amount of skim milk which represents 15½% by weight of the final batch. According to Rogers' book entitled Fundamentals of Dairy Science (Reinhold Publishing Corporation), 2nd edition, page 35, skim milk contains between 90.35 to 90.25 per cent of water. Hence the water thus added will represent about 14% by weight of the final batch. To this skim milk, there has been added a normal amount of lactic acid starter (commercial). Other ingredients which are added to the batch are about 3% of salt, ⅓% of a sulfoacetate of the monoglyceride and/or the di-glycerides of appropriate fatty acids such as stearic acid, palmitic acid or oleic acid. 1/10 of 1% of benzoate of soda and 1/10 of 1% of lecithin are added to the batch together with a flavoring material such as a di-acetyl or di-acetyl compound. Any desired amount of vitamins A and D may also be added to the batch.

As a result of the addition of the aforesaid ingredients, the temperature of the batch or mix drops to about 90° to 95° F., at which temperature the entire batch is well mixed together by agitating in any efficient type of churn.

It will be understood that the above procedure represents a typical normal procedure in the preparation of a batch or blend of oleomargarine, and the various percentages of the ingredients or the ingredients themselves may be varied to suit individual preferences or requirements. It is sufficient to say that, up to this point, the procedure may be described as typical of any good oleomargarine manufacturing procedure.

According to my new improved method, the mix or blend prepared as above described, and being at a temperature of about 90° to 95° F. so that it is in a quite liquid condition, is cooled, preferably as a part of a continuous operation, to a temperature of 75° to 85° F., although such temperature may of course be varied in order to suit the requirements of different oils or fats and variations in other ingredients of the batch.

However, regardless of the exact temperature to which the mix is cooled, it seems to be quite desirable that the amount of cooling, i. e., the degree to which the temperature is reduced, and the time at which the material is held at or slightly above said temperature is such as to bring the material into the required "condition" for the subsequent viscolizing step.

On this point, I have had good results by lowering the temperature quite rapidly to about 75° to 85° F. and then holding the material at that temperature for a period of from 5 to 15 minutes until the required "condition" is obtained. The desirable "condition" of the mix or blend appears to be evidenced by a more or less grainy condition which develops in the blend, which is probably due to the partial solidification of the material in the form of relatively large particles or agglomerations, which perhaps may also be termed "crystals."

When the material has reached the proper "condition," it is viscolized. This is effected by pumping the material at a pressure of from 100 to 1500 pounds per square inch through a viscolizing valve of standard make. I have obtained best results by using a pressure of 1000 pounds per square inch where the rate of flow was 100 pounds a minute. The temperature rises a few degrees as a result of the viscolizing step, but such rise in temperature does not seem to be of any consequence.

After the viscolizing step, the material requires no further processing and no further cooling or other procedure. It can be charged directly into the final shipping packages, and, in view of the fact that it is of a creamy or semi-liquid consistency, it may be put or packaged in cans or any other similar containers such as are used for packaging lard or similar fats or oils. After the containers have been filled with the material, they are put into a cooling room and handled in the same way any finishing package of butter or oleomargarine is handled.

When it has reached normal storage temperature at which oleomargarine is kept, the material is found to possess all of the desirable characteristics which are possessed by the finest grade of oleomargarine. The body and texture is excellent. It does not have the greasy surface charactertistic which is sometimes possessed by some grades of oleomargarine, and furthermore, it will retain these desirable characteristics for any reasonable period of time which may elapse between the time of manufacture and the time of final consumption.

After the material has passed through the viscolizing valve, the grainy condition which was observed before the viscolizing step appears to have entirely disappeared. This, of course, might be expected as a result of any viscolizing operation in the case of any material which is capable of being forced through a viscolizing valve when in a grainy condition.

However, although the agglomerations or crystals which caused the grainy condition have apparently disappeared, the material does not possess the same properties as it would have possessed if the grainy condition had not been developed prior to viscolization. This seems to be shown by the fact that, if the material is subjected to a viscolizing step while at a temperature of say 95° F. and before any grainy condition has developed, the viscolizing operation appears to give no benefit in that the material will develop a grainy condition after viscolization and hence will be quite unsatisfactory as a salable article.

Although I am unable to supply proof that my explanation or theory is correct, I believe that the beneficial effect found by viscolizing after a grainy condition has developed is caused by the breaking up of the large accretions or crystals of the material into a tremendous number of minute particles each of which is a nucleus around which further solidification or crystallization takes place, but, in view of the fact that there is an almost infinite number of these small nuclei, all of which are of more or less uniform size, they will, all of them, grow, upon cooling, to a more or less uniform size, but such uniform size will be, nevertheless, of relatively infinitesimal size when compared with the size of the particles which form a grainy condition.

I claim:

1. The improvement in the art of manufacturing oleomargarine, which consists in making a liquid mix containing about 85 parts of fat having a melting point of about 95° F., about 15 parts of skim milk, and about 3 parts of salt, stirring the ingredients at a temperature of about 95° F., then reducing the temperature to about 75° F. to 85° F. so as to develop a grainy condition in the mix, then viscolizing the mix at a pressure differential of from 200 to 500 pounds per square inch before permitting any substantial further reduction in temperature, and then charging the material into shipping receptacles while still fluid.

2. The improvement in the art of manufacturing oleomargarine, which consists in making a mix containing about 80% of a fat having a melting point of about 95° F. and about 15% of skim milk, while heating the same sufficiently to produce a liquid mix, and stirring the ingredients of the liquid mix, cooling the mix down to a temperature substantially below the melting point of the mix so as to develop a grainy condition of the mix, then viscolizing the mix by forcing the grainy material through an orifice at a pressure differential of between 100 and 1500 pounds per square inch before permitting any substantial further reduction in temperature, and then charging the material into shipping receptacles while still fluid.

CLARENCE E. NELSON.

REFERENCES CITED

The following references are of record in the file of this patent:

UNITED STATES PATENTS

| Number | Name | Date |
|---|---|---|
| 2,234,931 | Newton | Mar. 11, 1941 |
| 2,206,419 | Miller | July 2, 1940 |

Certificate of Correction

Patent No. 2,434,429. January 13, 1948.

CLARENCE E. NELSON

It is hereby certified that error appears in the printed specification of the above numbered patent requiring correction as follows: Column 2, line 40, for "100° F." read *110° F.*; and that the said Letters Patent should be read with this correction therein that the same may conform to the record of the case in the Patent Office.

Signed and sealed this 13th day of April, A. D. 1948.

[SEAL]

THOMAS F. MURPHY,
*Assistant Commissioner of Patents.* any substantial further reduction in temperature, and then charging the material into shipping receptacles while still fluid.

CLARENCE E. NELSON.

REFERENCES CITED

The following references are of record in the file of this patent:

UNITED STATES PATENTS

| Number | Name | Date |
|---|---|---|
| 2,234,931 | Newton | Mar. 11, 1941 |
| 2,206,419 | Miller | July 2, 1940 |

Certificate of Correction

Patent No. 2,434,429. January 13, 1948.

CLARENCE E. NELSON

It is hereby certified that error appears in the printed specification of the above numbered patent requiring correction as follows: Column 2, line 40, for "100° F." read *110° F.*; and that the said Letters Patent should be read with this correction therein that the same may conform to the record of the case in the Patent Office.

Signed and sealed this 13th day of April, A. D. 1948.

[SEAL]

THOMAS F. MURPHY,
*Assistant Commissioner of Patents.*